United States Patent Office 3,686,193
Patented Aug. 22, 1972

---

3,686,193
PERCHLORINATED VINYLCYANOPYRIDINES
Howard Johnston, 430 Las Lomas Way 94598, and Sven H. Ruetman, 55 El Camino Corto 94546, both of Walnut Creek, Calif.
No Drawing. Filed Jan. 28, 1971, Ser. No. 110,754
Int. Cl. C07d 31/46
U.S. Cl. 260—294.9
2 Claims

ABSTRACT OF THE DISCLOSURE

Compounds corresponding to the formula

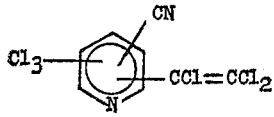

with the proviso that the cyano group (—CN) is not in a position ortho to the trichlorovinyl group (—CCl=CCl$_2$)

These compounds are prepared by vapor phase chlorination and have utility as pesticides for the control of a variety of plant, bacterial and fungal pests.

SUMMARY OF THE INVENTION

The present invention is directed to perchlorovinyl-cyanopyridines corresponding to the formula

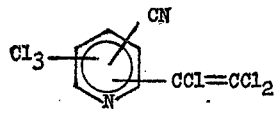

with the proviso that the cyano group (—CN) is not in a position ortho to the trichlorovinyl group (—CCl=CCl$_2$)

The compounds of the present invention are crystalline solids or liquids of low solubility in water and of moderate solubility in common organic solvents.

The compounds of the present invention are useful as pesticides for the kill and control of a wide variety of plant, bacterial and fungal pests such as, for example, the aquatic plants—Elodea, Cabomba, Milfoil and Chlorella algae, pigweeds—*Staphylococcus aureus* and Downey mildew, among others.

The pyridine compounds of the present invention can be prepared by the vapor phase chlorination of an ethyl or vinyl substituted cyanopyridine. This reaction can be characterized as follows:

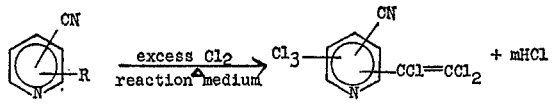

wherein R represents ethyl or vinyl and *m* corresponds to the total number of hydrogens present on the R group and in the ring.

In carrying out this reaction, a mixture of the pyridine feed compound and a diluent, i.e. reaction medium, which has been prevaporized are rapidly and turbulently mixed with an excess over the stoichiometric amount of gaseous chlorine during a brief contact time, usually at a maximum of about 2 minutes, and preferably from about 5 to about 35 seconds, at temperatures of from about 525° to about 625° C. In actual operations, within the disclosed ranges, the contact time usually is varied inversely with the operating temperature. Generally, there is provided between about 30 to about 100 percent excess of chlorine over the stoichiometric requirement needed for the desired product and hydrogen chloride by-product formation.

Representative diluents or reaction media suitable for use in this process are materials which are not detrimentally reactive under the reaction conditions with chlorine, the pyridine reactant or product including, for example, nitrogen, carbon dioxide, tetrachloroethylene, hexachlorobutadiene, chloroform and carbon tetrachloride and the like. The preferred diluent is carbon tetrachloride.

Operating pressures are not critical and may vary from subatmospheric to somewhat superatmospheric. Atmospheric pressure is satisfactory and is preferred.

In a preferred method of carrying out the preparation of the compounds of the present invention, a pyridine reactant and diluent are first introduced into an evaporator to produce a vaporized mixture of the pyridine compound in the inert diluent. The evaporator is maintained at a temperature at which rapid vaporization occurs, usually in the range of from about 275° C. to about 350° C., preferably at about 300° C. Any vaporizing device may be employed as evaporator but a wiped film evaporator has been found convenient.

For efficient operation it is necessary that the rate of reactant and diluent introduction and/or temperature of the evaporator be maintained so as to completely vaporize the reactant pyridine compound and maintain it in the vaporized state. It has been noted that incomplete vaporization results in decreased yield of the desired chlorinated vinylcyanopyridine product. The mixed vapors are conducted from the evaporator and rapidly and turbulently mixed with the gaseous chlorine. Preferably, this mixing occurs just prior to entry into a chlorinating reactor in which the resulting gaseous mixture is subjected to a turbulent flow under the temperature and time conditions set forth hereinbefore. Ordinarily, a turbulence sufficient to provide a Reynolds number of from about 800 to about 2000 is used and an inlet vapor velocity of about 1200 to 3000 centimeters per second has been found to be satisfactory. The reactor is preferably insulated to permit the reaction to take place under adiabatic conditions. Alternatively, non-adiabatic conditions can be employed wherein conventional heat exchange techniques are employed to maintain the reaction temperature, making appropriate adjustments in the heat capacity of the reaction mixture by regulating the proportion of diluent employed.

The actual mixing of the vaporized reactants can be accomplished in a nozzle which in turn injects the mixture into the chlorinating recator. Alternatively, the mixed vapors of pyridine compound and diluent and gaseous chlorine may be simultaneously but separately introduced into the reactor; in such a case, for optimum yields the chlorine must be jetted in close to the point of introduction of the pyridine compound and in such a manner to ensure very rapid mixing and turbulent flow of the reactants.

The vapors passing from the reactor are cooled or quenched to separate (a) a liquid mixture comprising polychlorinated vinylcyanopyridine products, diluent and unreacted or partially reacted pyridine compounds from (b) a gaseous mixture comprising chlorine and hydrogen chloride by-product.

The liquid mixture may be fractionally distilled to recover the desired products in substantially pure form or may be cooled to precipitate the product which is then recovered as by filtration. The product whether recovered by distillation or by precipitation and filtration may be further purified, if desired, by methods well known to those skilled in the art.

Any suitable reactor may be employed and, since the reaction is exothermic, strong heating is required only at the initiation of the reaction. Thereafter heat input is only necessary to compensate for heat loss to the environment. The inlets, outlets and interior surfaces of the reactor must be of materials which resist corrosive attack by chlorine and hydrogen chloride at high temperatures. Thus, for example, such surfaces may be nickel, carbon, silica or glass. In practice, it has been found that thermally resistant, high-silica glass such as Vycor brand is satisfactory.

DESCRIPTION OF SOME PREFERRED EMBODIMENTS

The following examples illustrate the present invention and the manner by which it can be practiced but, as such, should not be construed as limitations upon the overall scope of the same.

Example I—3,4,6-trichloro-5-(trichlorovinyl)-2-cyanopyridine

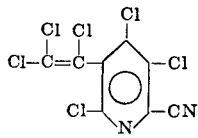

A cylinder of Vycor high-silica glass of 7.0 centimeters in diameter and about 35 centimeters in length was tapered to inlet and outlet tubes and fitted with electrical heating coils and efficient insulation to serve as a reactor having a capacity of about 1.35 liters. The outlet was connected to a coolable collection vessel and the latter was vented through a reflux condenser to an acid-gas recovery system. The inlet tube ended in a nozzle projecting about 2.5 cm. into the reactor and having an opening into the reactor about 2.5 millimeters in diameter. Inside the nozzle was a smaller concentric tube for chlorine introduction ending 1.25 centimeters before said nozzle opening. The upstream end of the inlet tube connected to an electrically heated vaporizer-preheater tube.

A vaporized solution consisting of 27.8 grams of 5-ethyl-2-cyanopyridine in 250.2 grams of carbon tetrachloride was passed from the preheater tube to the inlet nozzle of the reactor at a rate of 2.0 grams per minute, based on the weight of 5-ethyl-2-cyanopyridine, and was rapidly mixed with chlorine gas being introduced at a rate of 4.65 grams per minute. The reactant mixture was forced through the nozzle into the reactor at a velocity of about 1930 centimeters per second. The molar ratio of chlorine to pyridine compound feed in the reaction mixture was about 43 moles of chlorine per mole of pyridine compound. The reaction was carried out at a reactor temperature of 600° C. with a residence time of 14 seconds. The reaction was continued for a total of about 2¼ hours. The excess chlorine and HCl by-product were removed by evaporation from the product mass in the collector vessel. The remaining crude product was distilled and the 3,4,6-trichloro-5-(trichlorovinyl)-2-cyanopyridine product fraction boiling at 159–160° C. at 3.5 millimeters of mercury collected. The product was further purified by recrystallization from hexane and recovered in a yield of 38.7 grams and melted at 72–73.5° C. The product was found by analysis to have carbon, chlorine and nitrogen content of 28.66, 62.88 and 8.39 percent, respectively, as compared with the theoretical contents of 28.52, 63.15 and 8.31 percent, respectively, calculated for the above-named structure.

The following compounds of the present invention are prepared in accordance with methods hereinbefore set forth.

3,5,6-trichloro-2-(trichlorovinyl)-4-cyanopyridine having a molecular weight of 336.8 prepared by the chlorination of 2-vinyl-4-cyanopyridine;

3,4,5-trichloro-6-(trichlorovinyl)-2-cyanopyridine having a molecular weight of 336.8 prepared by the chlorination of 6-vinyl-2-cyanopyridine;

2,4,5-trichloro-6-(trichlorovinyl)-3-cyanopyridine having a molecular weight of 336.8 prepared by the chlorination of 6-ethyl-3-cyanopyridine;

2,4,6-trichloro-5-(trichlorovinyl)-3-cyanopyridine having a molecular weight of 336.8 prepared by the chlorination of 5-ethyl-3-cyanopyridine; and 3,5,6-trichloro-4-(trichlorovinyl)-2-cyanopyridine having a molecular weight of 336.8 prepared by the chlorination of 4-ethyl-2-cyanopyridine.

In accordance with the present invention, it has been discovered that the perchlorovinylcyanopyridine compounds can be employed as pesticides for the control of many bacterial, fungal, aquatic and terrestrial plant pests. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles or cellulosic materials to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to apply the compounds as wettable powders.

In a representative operation, 3,4,6-trichloro-5-(trichlorovinyl)-2-cyanopyridine was found to give from 95 to 100 percent kill and control of the aquatic plants Elodea, Cabomba, Milfoil and Chlorella algae, when employed, as the sole toxicant, in aqueous dispersion at a concentration of 10 parts per million parts of the ultimate dispersion.

In another operation, 3,4,6-trichloro-5-(trichlorovinyl)-2-cyanopyridine was found to give 100 percent kill and control of pigweeds when applied as the sole toxicant and as an aqueous dispersion to said plant species at a dosage rate equal to 10 pounds per acre.

In other operations, 3,4,6-trichloro-5-(trichlorovinyl)-2-cyanopyridine was found to give substantially complete kill and control of the causative organisms of Downey mildew and apple scab fungus when applied as the sole toxicant in an aqueous dispersion at a concentration of 400 parts per million parts of the ultimate dispersion.

In another representative operation, 3,4,6-trichloro-5-(trichlorovinyl)-2-cyanopyridine when employed as the sole toxicant in a nutrient agar at a concentration of about 500 parts by weight of the compound per million parts of agar, was found to give 100 percent kill and control of the organisms *Staphylococcus aureus, Trichophoton mentagrophytes, Bacillus subtilis, Candida pelliculosa, Pullu-*

*laria pulluans*, acid fast bacterium and *Rhizopus nigricans*.

What is claimed is:
1. A compound corresponding to the formula

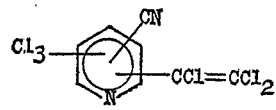

with the proviso that the cyano group (—CN) is not in a position ortho to the trichlorovinyl group (—CCl=CCl$_2$)

2. The compound of claim 1 which is 3,4,6-trichloro-5-(trichlorovinyl)-2-cyanopyridine.

References Cited
UNITED STATES PATENTS
2,938,035  5/1960  Cislak _____ 260—294.9

ALAN L. ROTMAN, Primary Examiner

U.S. Cl. X.R.
424—263